US009159110B2

(12) United States Patent
Hyoung et al.

(10) Patent No.: US 9,159,110 B2
(45) Date of Patent: Oct. 13, 2015

(54) SYSTEM AND METHOD FOR PROPAGATING INQUIRIES AND ANSWERS THERETO THROUGH ON-LINE HUMAN NETWORK

(75) Inventors: Yong Joon Hyoung, Seongnam-Si (KR); Kwang Yong Choi, Seongnam-Si (KR)

(73) Assignee: NHN CORPORATION, Seongnam-si (KR)

(*) Notice: Subject to any disclaimer, the term of this patent is extended or adjusted under 35 U.S.C. 154(b) by 1080 days.

(21) Appl. No.: 11/781,136

(22) Filed: Jul. 20, 2007

(65) Prior Publication Data

US 2008/0046516 A1 Feb. 21, 2008

Related U.S. Application Data

(63) Continuation of application No. PCT/KR2005/004561, filed on Dec. 27, 2005.

(30) Foreign Application Priority Data

Jan. 22, 2005 (KR) ........................ 10-2005-0006108
Jan. 22, 2005 (KR) ........................ 10-2005-0006110

(51) Int. Cl.
*G06F 15/16* (2006.01)
*G06Q 50/20* (2012.01)

(52) U.S. Cl.
CPC ...................................... *G06Q 50/20* (2013.01)

(58) Field of Classification Search
CPC . G06Q 50/20; G06Q 50/205; G06Q 50/2053; G06Q 50/2057; G06Q 50/01; G06Q 99/00; H04L 67/306
USPC .......................................... 709/204, 207, 240
See application file for complete search history.

(56) References Cited

U.S. PATENT DOCUMENTS 5,948,054 A 9/1999 Nielsen
6,064,978 A * 5/2000 Gardner et al. .............. 705/7.32

(Continued)

FOREIGN PATENT DOCUMENTS

JP 2002-196971 7/2002
KR 10-2002-0014269 A 2/2002

(Continued)

OTHER PUBLICATIONS

International Search Report regarding PCT Application No. PCT/KR2005/004561 dated Apr. 11, 2006.

(Continued)

*Primary Examiner* — Phuoc Nguyen
*Assistant Examiner* — Davoud Zand
(74) *Attorney, Agent, or Firm* — Greer Burns & Crain Ltd.

(57) ABSTRACT

Disclosed is a method for sharing reliable information or knowledge with regard to a question using an on-line human network. The on-line human network-based knowledge sharing method is to share knowledge based on an acquaintance information database. The database stores the IDs of a plurality of users, and the correspondence relationships of the user IDs, which represent acquaintanceships between the users on the on-line human network. The method includes allowing a first user to write a question message in a form that can be forwarded through the network, generating a question ID for identifying the question message and storing the generated question ID, causing the ID of the first user to correspond to the question ID, allowing a second user who is acquainted with the first user to receive the message, and causing the ID of the second user to correspond to the question ID.

19 Claims, 13 Drawing Sheets

(56) References Cited

U.S. PATENT DOCUMENTS

| | | | | |
|---|---|---|---|---|
| 6,507,865 | B1 * | 1/2003 | Hanson et al. | 705/36 R |
| 6,571,234 | B1 * | 5/2003 | Knight et al. | 707/3 |
| 7,120,455 | B1 * | 10/2006 | Chen et al. | 455/466 |
| 7,433,921 | B2 * | 10/2008 | Ludwig et al. | 709/204 |
| 7,567,977 | B1 * | 7/2009 | White | 1/1 |
| 8,302,164 | B2 * | 10/2012 | Lunt | 726/4 |
| 8,572,221 | B2 * | 10/2013 | Galbreath et al. | 709/223 |
| 8,682,995 | B1 * | 3/2014 | Lawler et al. | 709/207 |
| 2001/0032244 | A1 * | 10/2001 | Neustel | 709/206 |
| 2002/0075303 | A1 * | 6/2002 | Thompson et al. | 345/751 |
| 2005/0120084 | A1 * | 6/2005 | Hu et al. | 709/206 |
| 2006/0101133 | A1 * | 5/2006 | Sbrzesny et al. | 709/220 |
| 2006/0106788 | A1 * | 5/2006 | Forrest | 707/4 |
| 2008/0235005 | A1 * | 9/2008 | Golan et al. | 704/9 |

FOREIGN PATENT DOCUMENTS

| | | | |
|---|---|---|---|
| KR | 10-2003-0004162 | A | 1/2003 |
| KR | 10-2003-0040273 | | 5/2003 |
| KR | 10-2004-0022139 | A | 3/2004 |
| KR | 10-0457325 | | 11/2004 |
| KR | 10-2005-0029097 | A | 3/2005 |

OTHER PUBLICATIONS

Written Opinion regarding PCT Application No. PCT/KR2005/004561 dated Apr. 11, 2006.

* cited by examiner

SYSTEM AND METHOD FOR PROPAGATING INQUIRIES AND ANSWERS THERETO THROUGH ON-LINE HUMAN NETWORK

CROSS-REFERENCE TO RELATED PATENT APPLICATIONS

This application is a continuation application under 35 U.S.C. §365(c) of International Application No. PCT/KR2005/004561, filed Dec. 27, 2005 designating the United States. International Application No. PCT/KR2005/004561 was published in English as WO2006/078094 A1 on Jul. 27, 2006. This application further claims the benefit of the earlier filing dates under 35 U.S.C. §365(b) of Korean Patent Application Nos. 10-2005-0006108 and 10-2005-0006110 which were filed Jan. 22, 2005. This application incorporates herein by reference the International Application No. PCT/KR2005/004561 including the International Publication No. WO2006/078094 A1 and the Korean Patent Application Nos. 10-2005-0006108 and 10-2005-0006110 in their entirety.

BACKGROUND

1. Field

The present disclosure relates to a method for propagating an inquiries, and more particularly, to propagating an inquiry through the Internet.

2. Discussion of the Related Technology

Computer networks, such as the wired/wireless Internet and intranets, have already been widely used as popularized communication means. The World Wide Web (WWW) and the other means, such as e-mail and messenger services, that allow members of cyber society to share information or obtain knowledge based on such networks have been actively utilized.

A general method of obtaining knowledge with respect to a specific question or inquiry using a computer network generally is to ask a question to people of an acquaintance who is expected to have knowledge in the relevant field, by sending e-mail or making contact with the acquaintance via a messenger service. However, this method can be used with people having close relationships with the user who has a question. The number of people who has a close relationship may not be enough to obtain reliable answers.

Another method includes a method of posting a question on a bulletin board of an association of like-minded persons, a community website, or a portal website on the Internet, and waiting for an answer. However, in this method, the range is also limited to persons who frequently access the corresponding association, community webpage or portal website, the provision of an answer may not be guaranteed, and there are many cases where the reliability of answers is low because answers are made by unspecified persons.

Recently, Internet service for allowing users to construct an on-line network or human network with other people using a computer network such as the Internet has been actively provided. The term “human network” refers to a network formed between people who have made acquaintance through social interaction. The term “acquaintance” refers to the range of persons who earn trust therebetween to some degree as a result of sharing information, experience, ideas, and a sense of belonging to a cyber community to some degree. Based on the aspects of general social life, acquaintances are established by knowing each other through connections through existing acquaintances, through blood relations, school relationships or neighborhood relationships, through belonging to specific organizations, or through the performance of joint work in a company or team.

Recently, due to the development and popularization of computer networks such as the Internet, such acquaintances may be established on-line. Various service technologies for supporting the active construction of such on-line human networks and providing a function of searching for necessary persons on the constructed human network have been proposed. In the technologies for constructing and managing the on-line human network, the principal goal of technical development in the field are to guarantee mutual reliability in view of the characteristic of a network, such as the Internet, in which a unspecified number of persons can gain access to the network, to construct a wide human network, and to minimize inconvenience with respect to the procedure.

The foregoing discussion in this section is to provide general background information, and does not constitute an admission of prior art.

SUMMARY

One aspect of the invention provides a method for facilitating propagation of inquiries and answers thereto in connection with a website, which allows users registered with the website to network with each other, wherein each user is allowed to maintain a network list of other users to share information, the method comprising; receiving, by a server of the website, an inquiry from a first user with a first command to send the inquiry to at least one user from a first network list of the first user; allowing, by the server, the at least one user from the first network list to access the inquiry, wherein the at least one user comprises a second user; receiving, by the server, a second command from the second user to send the inquiry to at least one user from a second network list of the second user; allowing, by the server, the at least one user from the second network list to access the inquiry, wherein the at least one user from the second network list comprises a third user; receiving, by the server, a third command from the third user to send the inquiry to at least one user from a third network list of the third user; allowing, by the server, the at least one user from the third network list to access the inquiry; tracking, by the server, the propagation of the inquiry so as to generate tracking information indicating that the inquiry is propagated from the first user to the at least one user from the first network list, that the inquiry is further propagated from the second user to the at least one user from the second network list and that the inquiry is further propagated from the third user to the at least one user from the third network list; receiving, by the server, an answer to the inquiry from a user accessible to the inquiry; determining, by the server, that the inquiry is originated from the first user using the tracking information; and notifying the first user that the answer is available.

In the foregoing method, the server may comprise a single computer or a plurality of interconnected computers whether clustered at a single geographical location or scattered at more than one geographical location. Tracking may comprise after receiving the first command, associating the inquiry with the first user and the at least one user from the first network list, after receiving the second command, associating the inquiry with the second user and the at least one user from the second network list; and after receiving the third command, associating the inquiry with the third user and the at least one user from the third network list. T racking further comprises processing information relating to association of the inquiry with users so as to generate the tracking information. Allowing the at least one user to access the inquiry comprises sending an email to the at least one user, wherein the email comprises the inquiry. Allowing the at least one user to access the inquiry comprises transmitting data to display the inquiry to a terminal associated with the at least one user when the at least one user logs on the website.

Another aspect of the invention provides a method for facilitating to obtain an answer to an inquiry in connection with a website, which allows users registered with the website to network with each other, wherein each user is allowed to maintain a network list of other users to share information, the method comprising; sending, from a terminal associated with a first user, a command to the website to send an inquiry to at least one user from a first network list of the first user; receiving, by the terminal, a first notification when a second user from the at least one user forwards the inquiry to at least one user from a second network list of the second user; receiving, by the terminal, a second notification when a third user from the at least one user forwards the inquiry to at least one user from a third network list of the third user; and receiving, by the terminal, an answer to the inquiry from a user to whom the inquiry has been forwarded.

In the foregoing method, the method may further comprise receiving, by the terminal, tracking information indicating that the inquiry is propagated from the first user to the at least one user from the first network list, that the inquiry is further propagated from the second user to the at least one user from the second network list and that the inquiry is further propagated from the third user to the at least one user from the third network list.

Still another aspect of the invention provides a method of facilitating propagation of a question message among users of a website, the method comprising: providing an acquaintance information database storing identifications (IDs) of a plurality of users registered with the website, wherein each registered user is allowed to maintain an acquaintance list comprising other registered users in the acquaintance information database; receiving from a first registered user a question message; assigning a question identification (ID) to the question message; associating a first user ID of the first registered user with the question ID; allowing, by a request of the first user, a second registered user selected from the acquaintance list of the first registered user to access the question message; and associating a second user ID of the second registered user with the question ID so as to generate tracking information indicating that the question message is propagated from the first registered user to the second registered user.

In the foregoing method, the method may further comprise allowing, by a request of the second registered user, a third registered user selected from the acquaintance list of the second registered user to access the question message; and associating a third user ID of the third registered user with the question ID, wherein the tracking information further indicates that the question message is further propagated from the second registered user to the third registered user. The method may further comprise: receiving, from the third registered user, an answer message in reply to the question message; determining that the question message is originated from the first registered user using the tracking information; and allowing the first registered user to access the answer message. The method may further comprise allowing the first registered user to access the tracking information. The method may further comprise allowing the first registered user to provide a predetermined incentive to at least one of the registered users, who are on a path to the third registered user who has answered the question message. The method may further comprise updating the acquaintance list of the first registered user to include information of the third registered user, who has replied to the question message.

Yet another aspect of the invention provides a computer executable command for use in connection with propagation of a question message, wherein the command is to initiate the foregoing method.

A further aspect of the invention provides a method for facilitating propagation of a question message via a website, the method comprising: providing a acquaintance information database, wherein the acquaintance information database comprises IDs of a plurality of users registered with the website, wherein each registered user is allowed to maintain an acquaintance list comprising other registered users in the acquaintance information database; providing a tracking database for storing information on propagation of question messages; receiving from a first registered user a question message; recording, in the tracking database, a first record indicating that the question message is received from the first registered user; allowing, by a request of the first registered user, a second registered user selected from the acquaintance list of the first registered user; recording, in the tracking database, a second record indicating that the question message from the first registered user is available to the second registered user; allowing, by a request of the second registered user, a third registered user selected from the acquaintance list of the second registered user; recording, in the tracking database, a third record indicating that the question message is forwarded from the second registered user to the third registered user; and recording, in the tracking database, a fourth record indicating that the question message from the second registered user is available to the third registered user.

In the foregoing method, the first record may comprise a question message ID and the first registered user ID. The second record may comprise a question message ID and a second registered user ID. The method may further comprise: receiving, from the third user, an answer message in reply to the question message; determining that the question message is originated from the first user using tracking information recorded in the tracking database; and allowing the first user to access the answer message using the tracking information. The method may further comprise allowing the first registered user to access the tracking information.

An aspect of the present invention provides a service provision method of allowing reliable information about or knowledge of predetermined questions to be shared using message records and an on-line human network.

Another aspect of the present invention provides a method of allowing a person, having received a question through a on-line human network, to continuously forward the received question to his or her acquaintances and allowing an answer to be forwarded to the person who first posed the question, thereby obtaining a reliable answer from a person who has expert knowledge in the relevant field. A further aspect of the present invention provides a method of enabling new on-line acquaintances to be established through the forwarding of questions and answers, thereby activating an on-line human network.

Yet another aspect of the present invention provides a method of allowing questions to be simply written and an answering or forwarding process to be performed in cooperation with an on-line human network management system. Still another aspect of the present invention provides a method of allowing the forwarding path of questions to be monitored via the on-line human network, thereby improving the dependability of the provision of answers. Still another aspect of the present invention to provides a method of activating the sharing of knowledge by issuing incentives to answer providers.

DETAILED DESCRIPTION OF EMBODIMENTS

Embodiments of the present invention will be described in more detail below with reference to the accompanying drawings.

Figure 1:
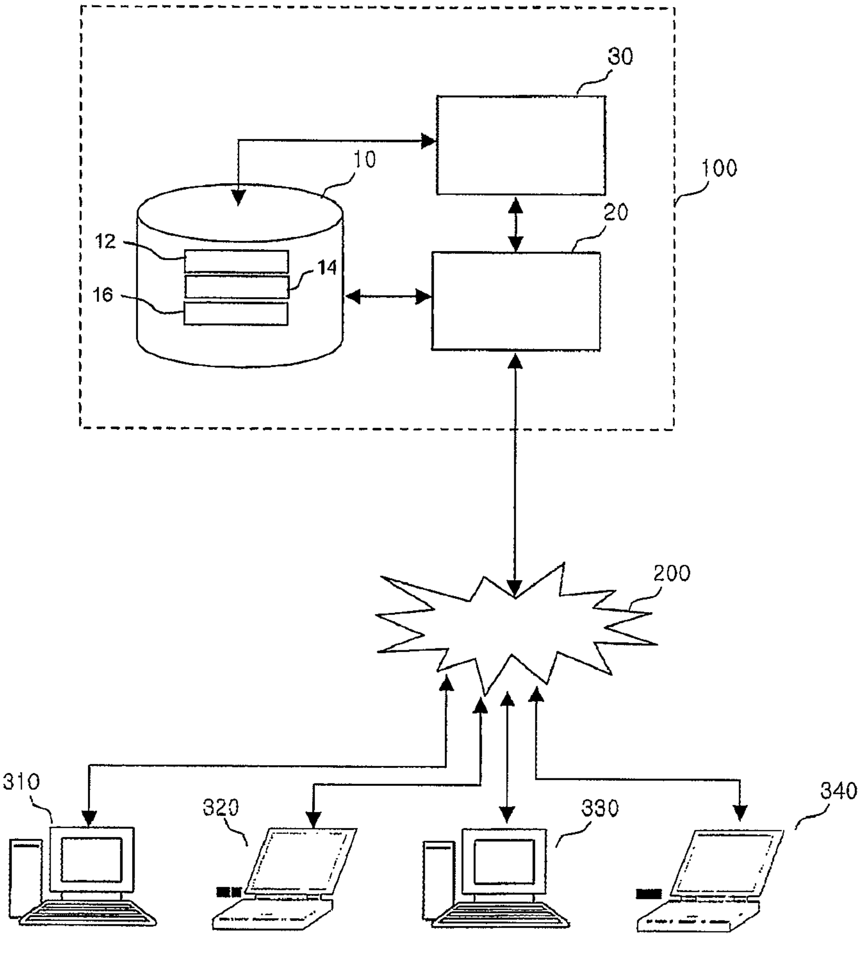
FIG. 1 is a schematic diagram illustrating a human network-based knowledge sharing system according to an embodiment of the present invention.

FIG. 1 is a schematic diagram illustrating a human network-based knowledge sharing system 100 according to an embodiment of the present invention. In one embodiment, the system 100 comprises a server. The server has a single computer or a plurality of interconnected computers whether clustered at a single geographical location or scattered at more than one geographical location. In one embodiment, the knowledge sharing system 100 includes a database 10, a question management server 30, and an application server 20.

The database 10 may include a user database 12, an acquaintance information database or relationship database 14, and a question database 16. The human network-based knowledge sharing system 100 can be accessed by using a plurality of user terminals 310, 320, 330 and 340 through a network 200 such as the wired/wireless Internet or an intranet. Although, for convenience of description, only four user terminals are shown in FIG. 1, the user terminals may be various kinds of fixed or mobile terminals such as a laptop computer, a desktop computer, a PDA and a PCS.

Users register with the human network-based knowledge sharing system 100 or a website provided by the system through the terminals 310, 320, 330 and 340. In such a registration process, the ID, password and personal information (occupation, sex, age, place of residence, office address, company name, alma mater, hobby and so on) of each user may be input. The user's information is converted into a predetermined data structure and is stored and managed in the user database 12. When each user subscribes to and registers with the service, the human network-based knowledge sharing system 100 may allow a predetermined program, which allows a user to easily use various functions provided by the system on his or her terminal, to be downloaded to and then executed on each user terminal in cooperation with an on-line human network search system (not shown).

The on-line human network-based knowledge sharing system is based on the acquaintances on the on-line human network, which are established between a plurality of users who have subscribed to the service or website through the network. The acquaintances on the on-line human network are stored in the acquaintance information database 14.

A process of establishing the illustrated acquaintances will be described in brief as an example with reference to FIG. 1. In order to establish primary on-line acquaintances between users, a process (D) of a first user transmitting an invitation message to the terminal 330 of a second user through his or her terminal 310, and the second user acknowledging the message in the terminal 330 and then transmitting an approval message may be performed. The invitation message and the approval message may have a variety of forms, such as e-mail or text messages. The human network-based knowledge sharing system 100 detects the performance of the invitation and approval process between two users and records the fact that the primary acquaintance has been established between the two users in the acquaintance information database 14 using a predetermined data structure. The second user may be a user who has not yet registered with the system. In this case, when the second user transmits an approval message with respect to the invitation, a process of registering the second user with the system as a user through data transmission/reception with the human network-based knowledge sharing system 100 may be performed. Alternatively, the acquaintance may be an on-line acquaintance that is established based on a membership in a specific portal website provided on the web, a community or an association without such invitation and approval or a corresponding procedure.

Figure 2:
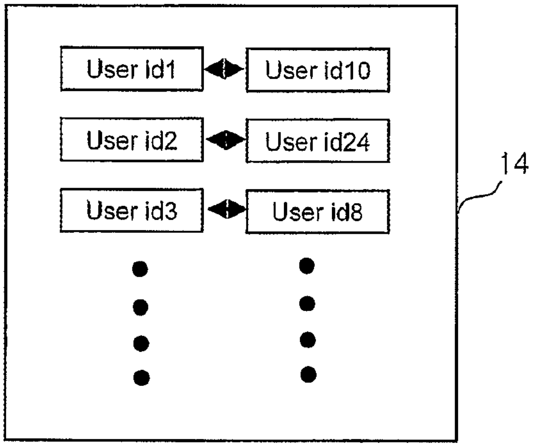
FIG. 2 illustrates the data structure of an acquaintance information database.

FIG. 2 illustrates a data structure within the acquaintance information database 14, which is formed through the above-described process. As illustrated in FIG. 2, the acquaintance information database 14 may have a data structure (this data structure is defined as a "relational data structure") in which the IDs of users who have primary acquaintances are stored with 1:1 correspondence. Such a data structure is advantageous in that the IDs of users can be sequentially stored in a correspondence fashion according to the time point of the occurrence of each event without changing the entire data structure whenever an invitation and approval process is performed, so that data management is very convenient.

Figure 3:
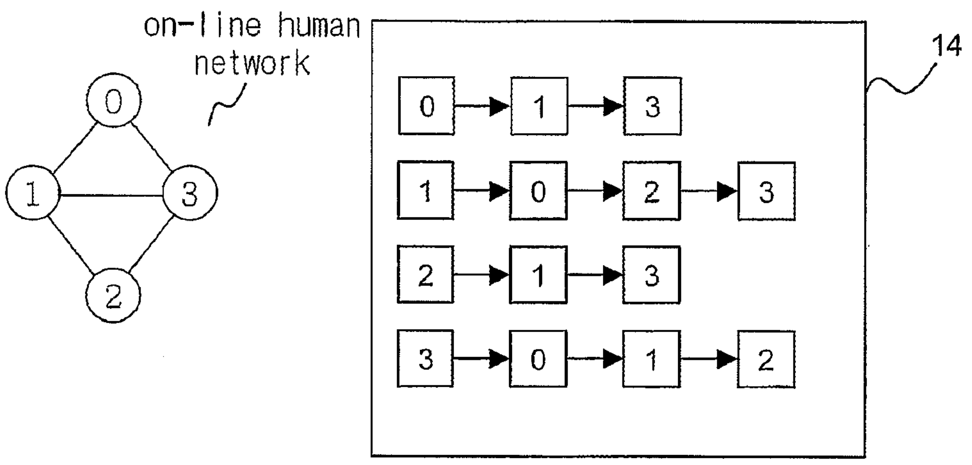
FIG. 3 illustrates a graph data structure obtained through the formation of an on-line human network.

FIG. 3 illustrates a graph data structure obtained as the result of the formation of the on-line human network. As an example, four nodes 0, 1, 2 and 3 are illustrated. The graph data structure illustrated in FIG. 3 is obtained through the relational data structure illustrated in FIG. 2. The data structure allows each user's location to be easily found on the entire human network. In this data structure, it can be considered that each of the nodes 0, 1, 2 and 3 corresponds to the ID of each user. Links connecting between the nodes 0, 1, 2 and 3 represent direct acquaintanceship (hereinafter defined as "primary acquaintanceship" or "a first degree of acquaintanceship"), which is formed between the respective users. In this case, the user corresponding to node 0 and the users corresponding to nodes 1 and 3 have primary acquaintanceship (a first degree of acquaintanceship). The user corresponding to node 0 and the user corresponding to node 2 have secondary acquaintanceship (a second degree of acquaintanceship).

The data structure within the acquaintanceship database 14, which is shown on the right side, is a data structure in which the human network represented by a graph diagram on the left side is reflected. On the left side, node 0 is connected to nodes 1 and 3, so that data 1 and 3 correspond to data 0 in the data structure on the right side.

Furthermore, on the left side, node 1 is connected to nodes 0, 2 and 3, so that data 0, 2 and 3 correspond to data 1 in the data structure on the right side. Since further analogical interpretation based on the above description is possible, a detailed description thereof is not given here. The on-line acquaintance can be represented using various data structures within the acquaintanceship database 14 as well as the above.

Figure 4:
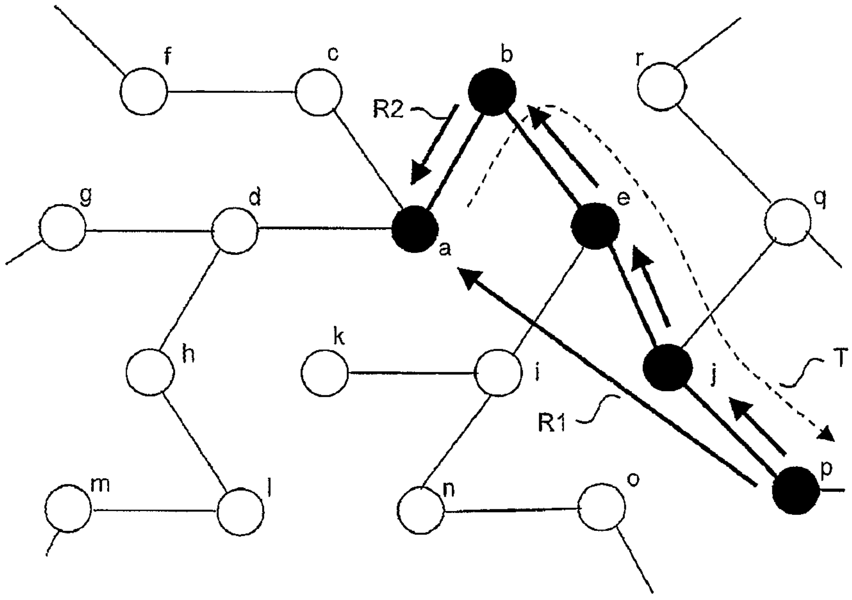
FIG. 4 is a schematic view illustrating the operation of the on-line human network-based knowledge sharing system according to an embodiment of the present invention.

FIG. 4 is a schematic view illustrating the operation of the on-line human network-based knowledge sharing system according to an embodiment of the present invention. In the case where the on-line human network shown in FIG. 4 is formed, if a first user 'a' has a question, the first user 'a' transmits the question to a second user 'b' who has primary acquaintanceship with the user 'a' in message form that can be transmitted through the network. In this case, the message format may include e-mail, a messenger, or the like. If the second user 'b' does not know the answer to the question, the first user 'a' may transmit the question to a third user 'e'. In a similar way, if the third user 'e' does not have corresponding knowledge, the question may be sequentially transmitted to a fourth user 'j' and a fifth user 'p'. If the fifth user 'p' has knowledge of a corresponding question, the fifth user 'p' may prepare an answer and directly transmit the answer to the first user 'a' (R1). Alternatively, the answer message of the fifth user 'p' may be sequentially (p-j-e-b-a) delivered to the question writer along a reverse path to the question message forwarding path. Through the operation, the first user 'a' can obtain a reliable answer to his or her question more dependably by utilizing the on-line human network that has already been constructed.

The server 20 can provide a variety of functions to a user who tries to send a question message utilizing the on-line human network. For example, to increase the reliability of an answer, a message can be sent to an acquaintance who shares the same interested field according to the category of the question. That is, the server 20 can provide a list of people who have acquaintanceship with a user, with reference to the interesting field information or personal information about the user in the acquaintance information database 14, with reference to the user database 10. A user who tries to send a question message with reference to such information can select an acquaintance who has the highest possibility of giving an answer to a corresponding question, among his or her acquaintances, and can transmit the question message to the selected acquaintance. Furthermore, the server 20 can provide information on users who have sent the largest number of answers or relayed many questions, and can provide the IDs of such users to a user who is preparing a question message. A message can be forwarded to such users by the server 20. The server 20 can also provide a setting menu for allowing a user who has asked a question to limit the number of relays. For example, the message relay is limited within a third degree of acquaintanceship from a question provider.

Figure 5:
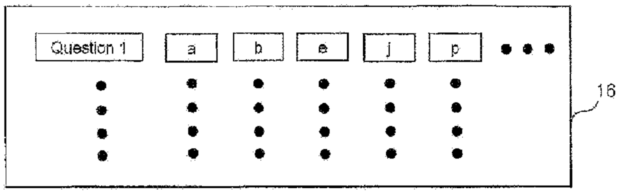
FIG. 5 illustrates the data structure of the question database of the on-line human network-based knowledge sharing system according to an embodiment of the present invention.
Figure 6:
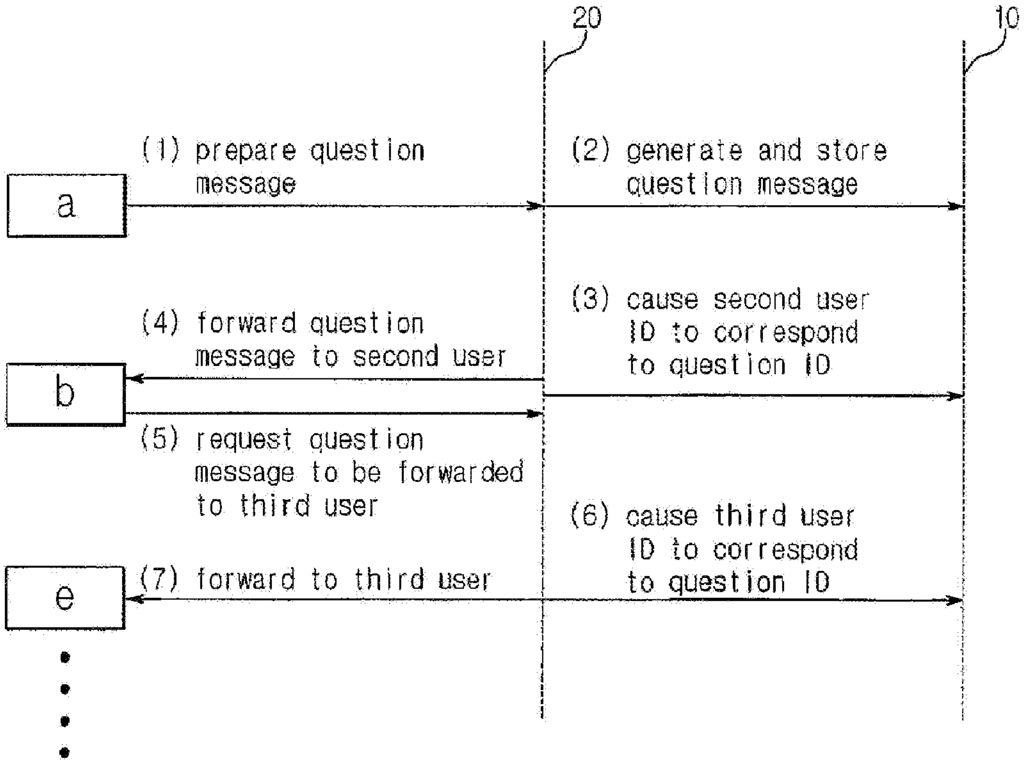
FIG. 6 illustrates a data processing procedure in the on-line human network-based knowledge sharing system according to an embodiment of the present invention.

FIG. 5 illustrates a data structure within the question database 16 of the on-line human network-based knowledge sharing system according to an embodiment of the present invention. FIG. 6 illustrates an embodiment of a data processing procedure according to an embodiment of the present invention. If the first user 'a' prepares a question message (1), the application server 20 generates a question ID for identifying the prepared question message and stores the generated question ID in the question database 16 within the database 10 (2). The application server 20 also stores the ID of the second user 'b', who is selected by the first user 'a' from users who are acquainted with the first user 'a', in association with the question ID (3), and forwards the question message to the second user 'b' (4). If the second user 'b' does not have corresponding knowledge (5), the second user 'b' requests the question message to be transmitted to the third user 'e' selected from his or her acquaintances. The application server 20 stores the ID of the third user 'e' in association with the question ID (6), and forwards the question message to the third user 'e' (7). Through this process, the question ID (Question idl) and the ID of each user can be stored using a corresponding data structure as in the example shown in FIG. 5. The data structure represents the forwarding path of the question message on the human network. Although, in the illustrated example, only an example in which the question message is forwarded 1:1 has been described for convenience of description, the question message can be forwarded from one user to a number of users through a similar process. For example, the question message may be forwarded to all of the acquaintances in a form such as broadcasting.

Figure 7:
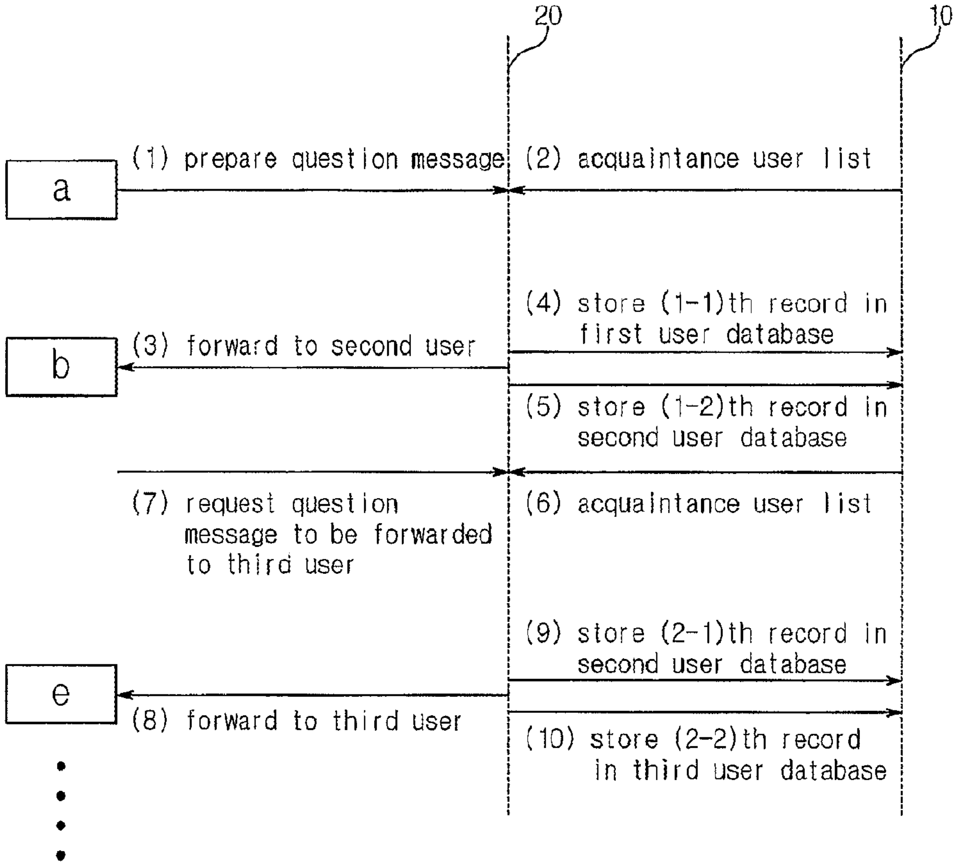
FIG. 7 illustrates the data processing procedure in the on-line human network-based knowledge sharing system according to an embodiment of the present invention.

FIG. 7 illustrates another embodiment of the data processing procedure in the on-line human network-based knowledge sharing system. If the first user 'a' writes a question message (1), the application server 20 can provide the first user 'a' with a list of counterparts to which the question message will be forwarded (2).

In a message transmission/reception and posting system and a transmission/reception and posting method issued to the present applicant as Korean Pat. No. 457325, there was proposed a technique in which, when a message is transmitted or received between a plurality of users who have subscribed to a service, a first record and a second record are generated based on a calling message and are then stored in the user database while corresponding to each user so that safe message transmission and reception and posting between authorized users are enabled and both a calling party and a called party have management authority over a posted message. In one embodiment, the on-line human network-based knowledge sharing system may employ the above message transmission/reception method.

Figure 8:
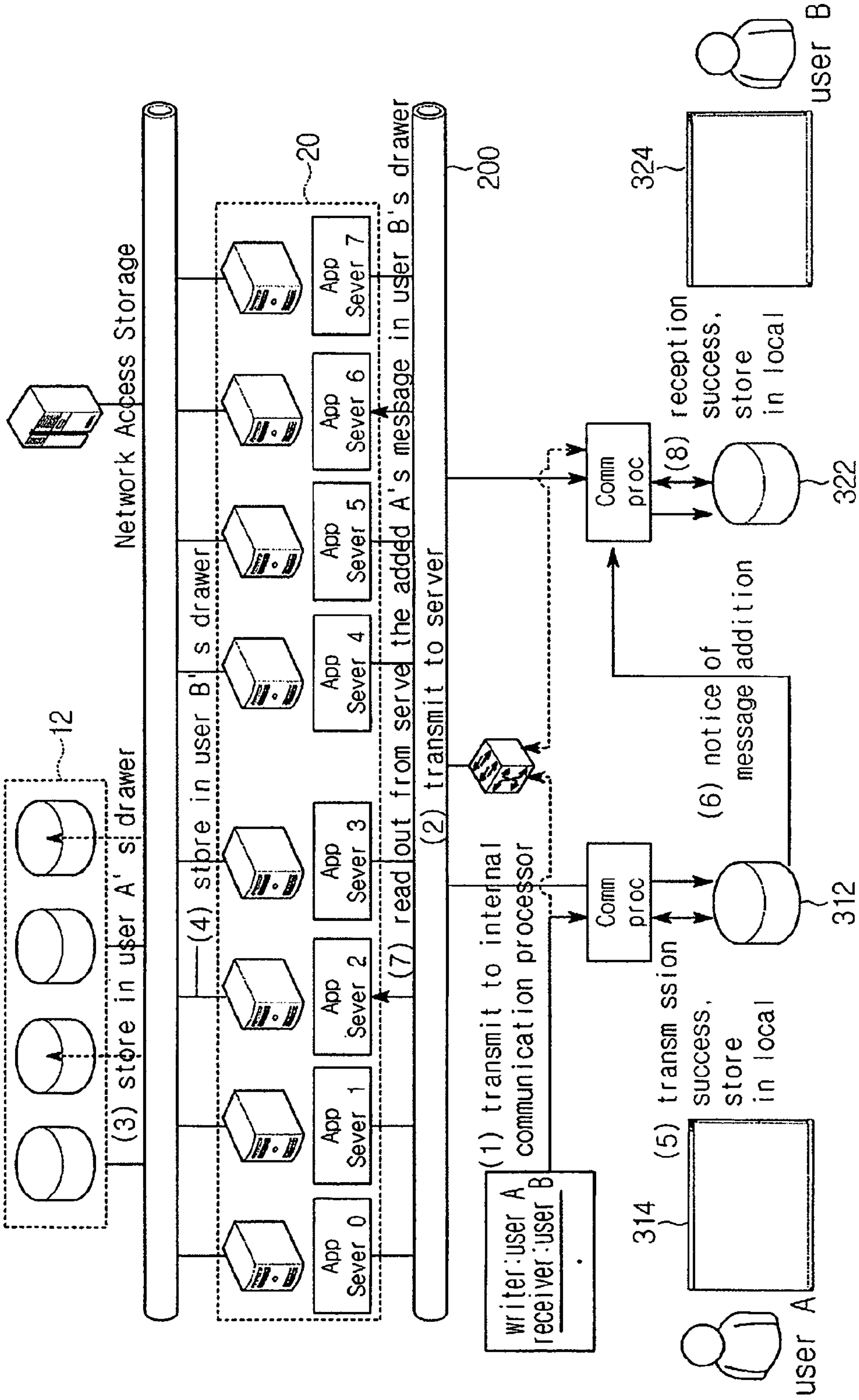
FIG. 8 is a schematic view illustrating a message management method of allowing messages to be transmitted and received safely between authorized users.

The message transmission/reception method is described below in more detail with reference to FIGS. 8 and 9. If a calling message is received from an application program 314 installed at the terminal, the application server 20 generates a first record for a calling party and a second record for a called party based on the calling message. The first and second records each include one or more of record fields, including a service user ID, a message ID, a corresponding message ID, a pertinent message bundle to which the message belongs, a message phase in the bundle, a calling party ID, a called party ID, a message title and message content. In the case, the message ID of the first record is a corresponding message ID in the second record. The corresponding message ID in the first record is the message ID of the second record. Therefore, the first and second records are logically interconnected through the message ID and the corresponding message ID field.

In the user database 12 are stored the first and second records by the application server 20. The user database 12 may be provided to every user who has subscribed to service. Accordingly, authority for the first and second records stored in the database can be given to the calling party and the called party, respectively, and can be managed by the calling party and the called party, respectively.

Figure 9:
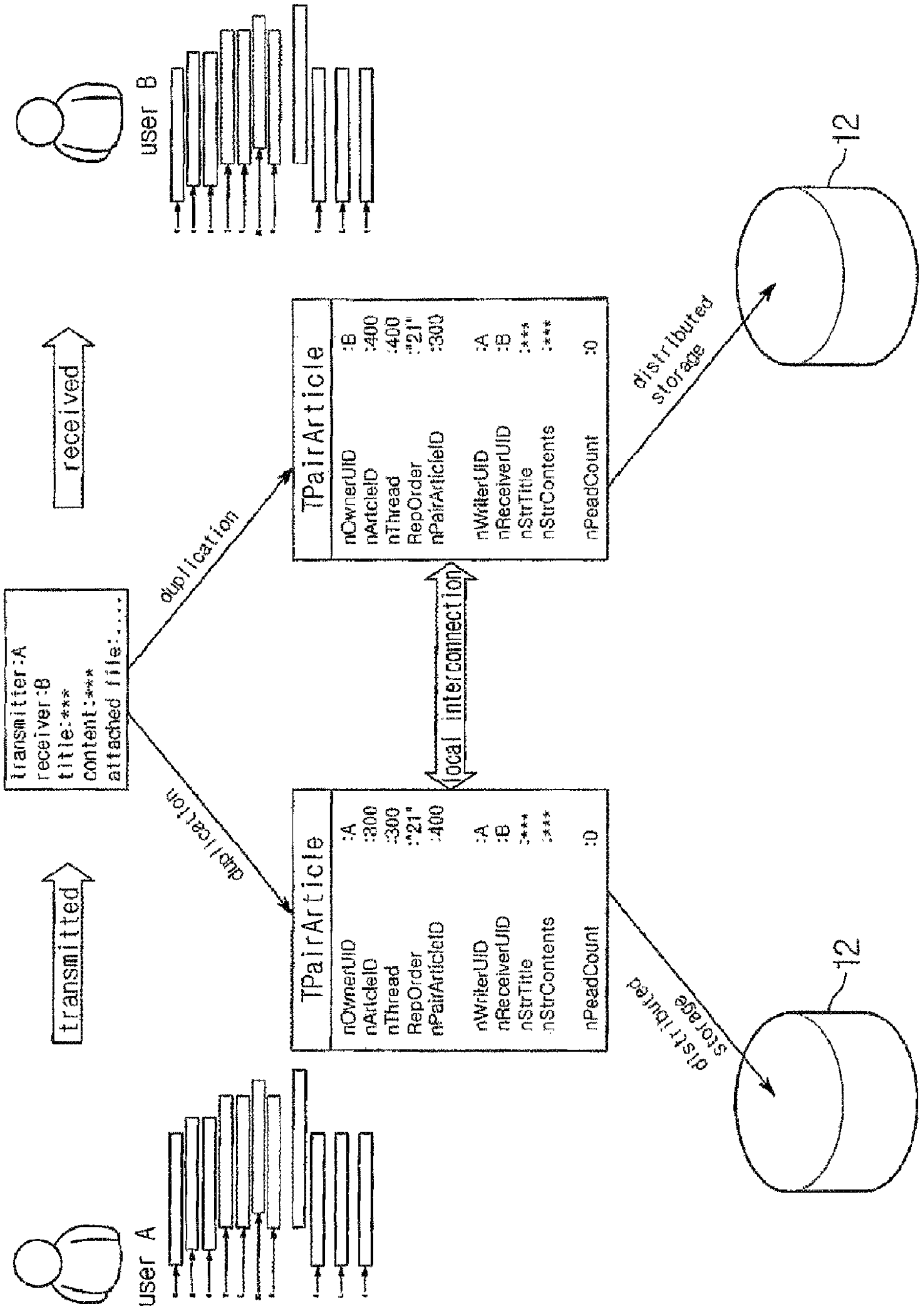
FIG. 9 illustrates the content of a message record in FIG. 8.

FIG. 9 illustrates the record configuration of each message. As shown in FIG. 9, each record may include one or more of record fields, including a service user ID (nOwnerUID), a message ID (nArticleID), a corresponding message ID (nPairArticleID), a pertinent message bundle (nThread) to which the message belongs, a message phase (RepOrder) in the bundle, a calling party ID (nWritcrID)(nWriterUID), a called party ID (nRcccivcrID)(nReceiverUID), a message title (nStrTitle) and message content (nStrContents).

nOwnerUID indicates user IDs to which the first and second records will be transferred, respectively. nArticleID indicates a storage address indicating that the first record corresponds to any one of messages stored in the user database 12 of the calling party. nPairArticleID indicates a storage address informing that the second record corresponding to the first record corresponds to any one of messages stored in the user database 12 of the called party.

Furthermore, nThread indicates a message bundle to which a transmitted message belongs, also indicates from which original message (the first message for a specific message, not an answer message) the transmitted message is derived, and follows nArticleID of the original message. In other words, if the transmitted message is the original message, nThread follows nArticleID. If the transmitted message is an answer message for the original message, nThread follows nThread of the original message. Since nThread of the original message is nArticle of the original message, nThread of an answer message for a specific message becomes nArticleID of the original message.

Furthermore, RepOrder indicates a phase within the message bundle to which the transmitted message belongs. RepOrder indicates the order of messages and the displayed indents of messages for hierarchical display of messages in the message bundle. In addition, nWriterUID indicates the ID of a user who has written a message, nReceiverUID indicates the ID of a user who will receive a message, and nStrTitle and nStrContents indicate the title and content of a message, respectively. If a user A sends a specific message to a user B as shown in FIG. 9, the application server 20 generates a first record for the user A and a second record for the user B based on the message of the user A. The first record is a record for the user A. Accordingly, nOwnerUID of the first record becomes A and nWriterUID and nReceiverUID become A and B, respectively.

300 and 21, that is, nThread and RepOrder, respectively, indicate that the message is a first answer message for a second answer message of the original message in the message bundle related to a message in which ArticleID of the original message is 300. Furthermore, nPairArticleID 400 indicates a storage address indicating that the second record corresponds to any one of the messages stored in the user database 12 of the user B and logically connects the first and second records. Since the second record is the record for the user B, nOwnerUID of the second record is B, and nWriterUID and nReceiverUID are A and B, respectively. 400 and 21, that is, nThread and RepOrder, respectively, indicate that the message is the first answer message for the second answer message of the original message in the message bundle in which ArticleID of the original message is 400. Furthermore, nPairArticleID 300 indicates a storage address indicating that the first record corresponds to any one of the messages stored in the user database 12 of the user A and logically connects the first record and the second record.

Therefore, in the case of the user A, the message is located within the message bundle, in which ArticleID of the original message is 300. In the case where the title of the answer message is expressed while separated from the title of the original message by a distance n, the title of the message is expressed while separated from the start column of the title of the original message by a distance 2*n*. Furthermore, in the case of the user B, the message is located within the message bundle in which ArticleID of the original message is 400. The title of the message is expressed while separated from the start column of the title of the original message by a distance 2*n*.

In addition, the application server 20 stores the first and second records in the user database 12 provided for the user A and the user database 12 provided for the user B, respectively. Accordingly, the user A and the user B can have authority for the first and second records, respectively, and can manage the records, respectively.

In FIG. 7, if the second user 'b' is selected as a counterpart, the application server 20 forwards the message to the second user 'b'. The application server 20 generates a $(1\_1)^{th}$ message record and a $(1\_2)^{th}$ message record, which correspond to the first message record and the second message record, respectively, as shown in FIG. 9 and stores the generated message records in the first and second user databases 12, respectively, within the database 10 (4) and (5).

Figure 10:
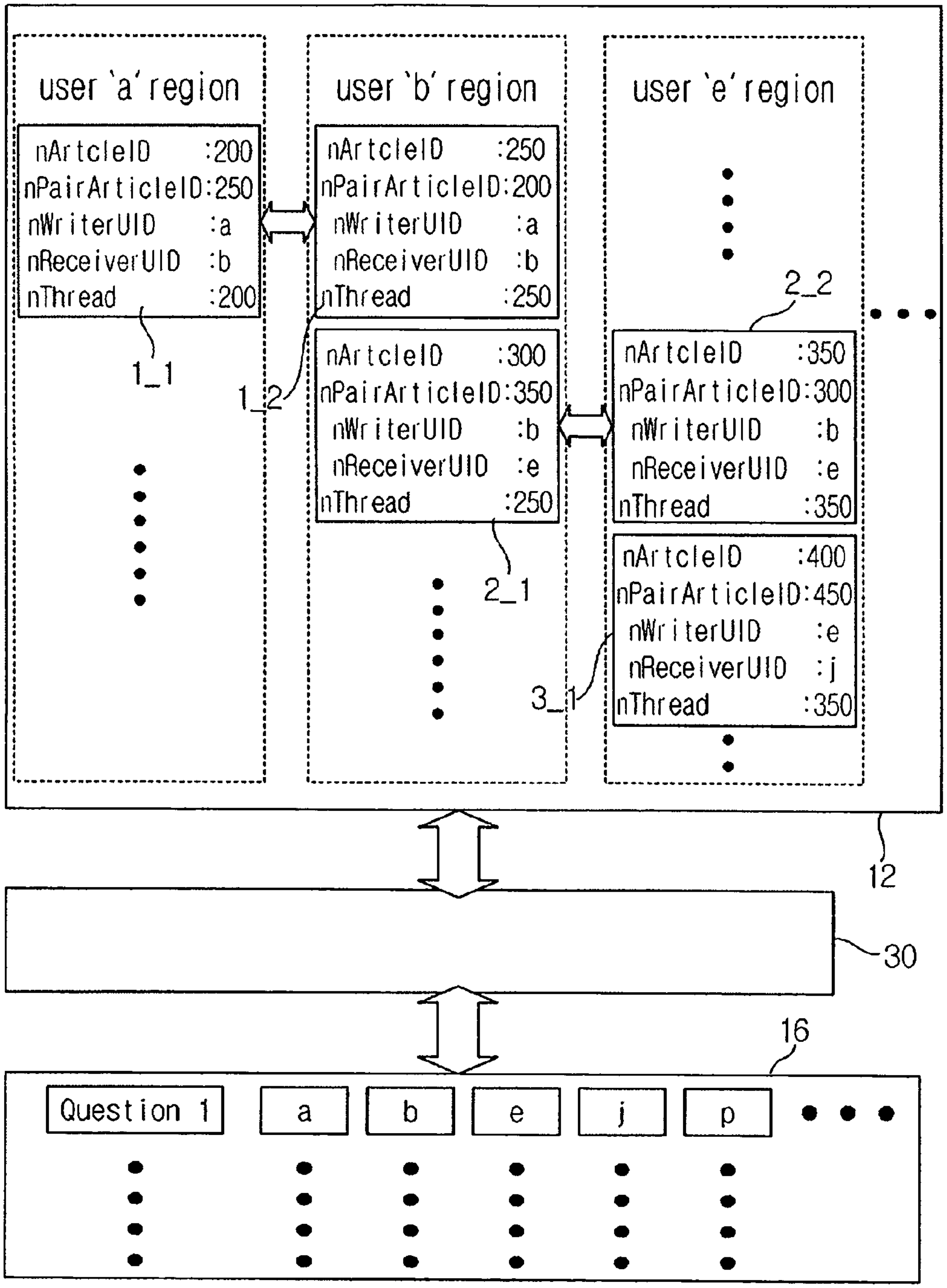
FIG. 10 illustrates the process of tracking the forwarding path of a question message on the on-line human network based on a message record generated in the process of forwarding the question message.

If the second user 'b' does not have corresponding knowledge, the second user 'b' is provided with the acquaintance list so that the second user 'b' can select a predetermined user among his or her acquaintances and forward the question message to the selected user (6). If forwarding of the question message is requested of the third user 'e' selected from among his or her acquaintances (7), the application server 20 forwards the message to the third user 'e', generates a $(2\_1)^{th}$ message record and a $(2\_2)^{th}$ message record and stores the generated message records in the databases of the second user and the third user, respectively. Through the repetition of the above process, the question message can be forwarded from one user to the other users along the path on the human network. As a result, the message records shown in FIG. 10 are stored in the user database 12. It is therefore possible to trace, display and analyze the question message forwarding path on the human network by searching the stored message records.

Although, for convenience of description, only the case where the question message is transmitted in a 1:1 manner has been described, the question message can be transmitted from one user to a plurality of users through a similar process. For example, the question message can be transmitted to all of the acquaintances by a method such as broadcasting.

FIG. 10 illustrates a process of tracking the forwarding path of the question message on the on-line human network based on the message records generated in the process of forwarding the question message. A region of users who have registered is allocated in the user database 12. In each user region are stored message records related to a corresponding user. Each of the message records may include various record fields as described above. However, only message ID (nArticleID), a message ID (nPairArticleID) corresponding to the message ID (nArticleID), a pertinent message bundle (nThread) to which the message belongs, a calling party ID (nWriterID) and a called party ID (nReceiverID) are shown in FIG. 10.

The question management server 30 searches for a forwarding path of a specific question message on the on-line human network based on the message records stored in the user database 12. The illustrated question message is first prepared by the user 'a' as shown in FIG. 4 and is transmitted to the user 'b'. Accordingly, a $(1\_1)^{th}$ message record and a $(1\_2)^{th}$ message record, which correspond to the region of the user 'a' and the region of the user 'b', respectively, are stored in the region of the user 'a' and the region of the user 'b', respectively, of the user database 12. A message ID ("200") is stored in the $(1\_1)^{th}$ message record along with a message ID ("250") of the $(1\_2)^{th}$ message record corresponding to the $(1\_1)^{th}$ message record.

The question management server 30 determines that the message has transmitted from the user 'a' to the user 'b' based on the $(1\_1)^{th}$ message record and determines that the message ID corresponding to the message is "250". Accordingly, the question management server 30 examines the message record 1_2 whose message ID is "250" by searching the database region of the user 'b', and determines whether the message record corresponds to the message whose message ID is "200", which has been placed in the region of the user 'a'.

Furthermore, the question management server 30 determines whether the message record 1_2 of the user 'b' has a pertinent message with reference to a pertinent message bundle (nThread) of the user 'b' region. It is determined that, in the illustrated message records, another message record 2_1 whose pertinent message bundle is "250" exists. The question management server 30 determines whether the user 'b' has sent an answer to the user 'a' or other users with reference to a called party ID of the message record 2_1. The illustrated message record 2_1 reads that the called party ID is the user 'e' and a corresponding message ID is "350". Therefore, the question management server 30 searches the message records of the user 'e' region and refers to the message record 2_2 having a corresponding message ID.

Through such a process, the question management server 30 can determine the forwarding path of the question message on the human network with reference to the message records stored in the user database 12. As a result of the determination, the question management server 30 can create new data indicating the forwarding path of the question message on the human network, as shown in the question database 16. The question management server 30 can cause the forwarding situation and path of a corresponding question on the human network to be displayed on the terminal of the user based on the data created on the question database 16.

Figure 11:
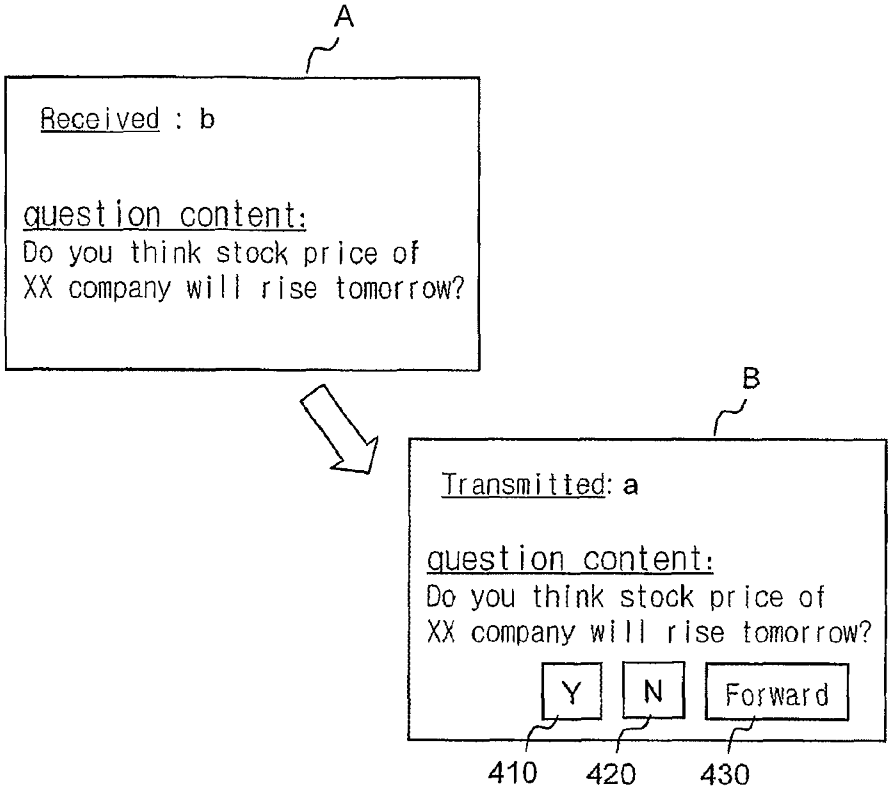
FIG. 11 illustrates the format of a question message forwarded in the knowledge sharing system according to an embodiment of the present invention.

FIG. 11 illustrates the format of the question message forwarded in the knowledge sharing system according to an embodiment of the present invention. It is possible to write a question message in a predetermined format using the program installed on his or her terminal at the time of subscription to membership. For example, as shown in FIG. 9, a called party can be specified and question content can be input. The user can be provided with a list through his or her terminal so that the user can select a party to be called from among his or her acquaintances within the on-line human network. If the first user writes a question message A, the question message A is forwarded to the second user 'b' selected from among the acquaintances, and the calling party and the question content are displayed (B).

The forwarded message may accompany various buttons for improving the convenience with which the called party can answer. A variety of buttons, such as an affirmation button 410, a negation button 420 and a forwarding-to-acquaintance button 430, can be provided. The buttons may have a question format such as a multiple choice system.

The program installed on the terminal of the question writer can provide various tools so that the format of the question message can be freely configured by the question writer. If the second user 'b' who has received the message clicks on the forwarding to his or her acquaintance (430) button, the second user 'b' is provided with a list so that the user can select one of his or her acquaintances. The application server recognizes the fact.

Figure 12:
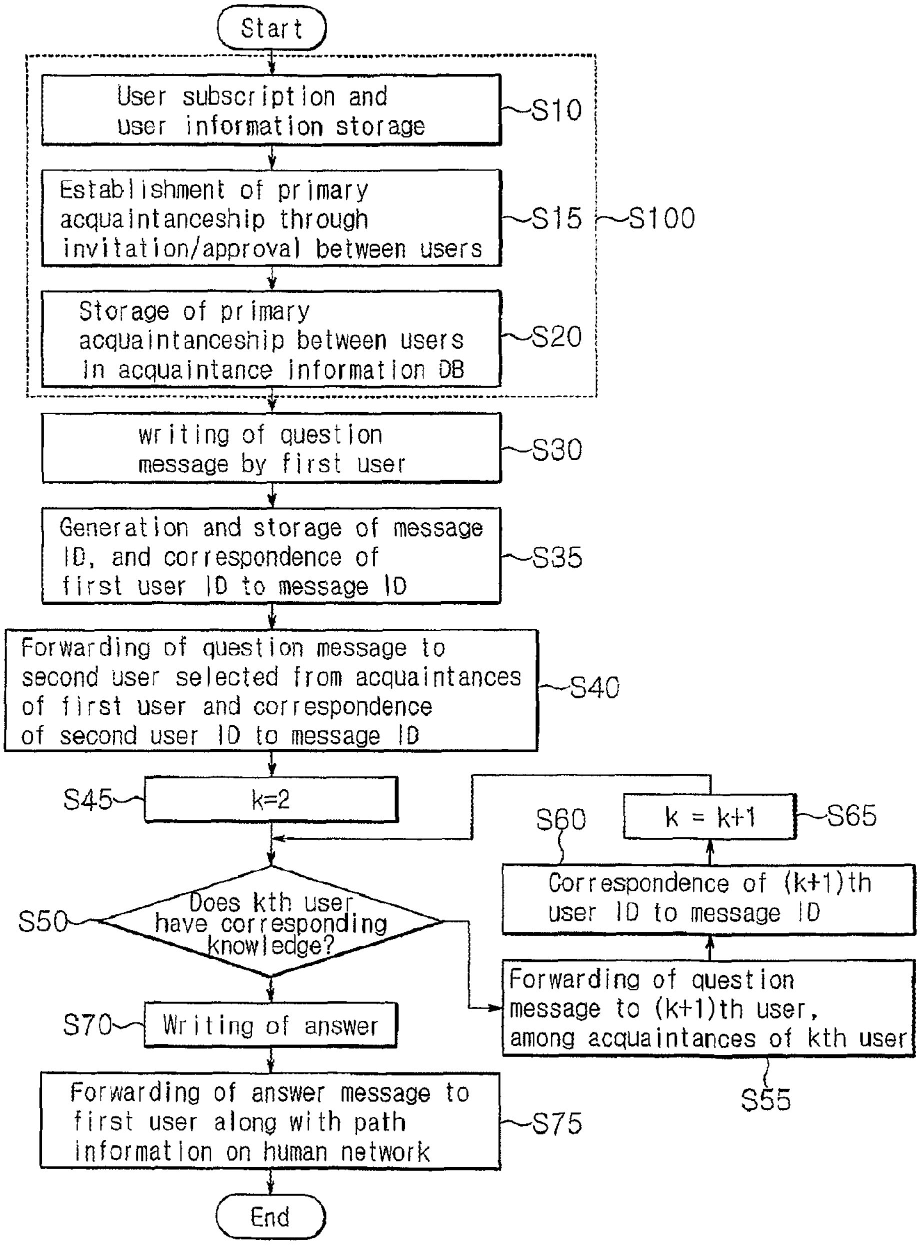
FIG. 12 is a flowchart illustrating an on-line human network-based knowledge sharing method according to an embodiment of the present invention.

FIG. 12 is a flowchart illustrating an embodiment of an on-line human network-based knowledge sharing method. A process of constructing an acquaintance information database constituting the on-line human network is shown (S100). When a user subscribes to the service, information about the user is stored (S10). The primary acquaintance is formed through the above-described invitation/approval process between users (S15). The server recognizes the primary acquaintance and stores information about the primary acquaintance between the users in the acquaintance information database as an adequate data structure (S20). Through the process, information about the on-line human network is constructed in the acquaintance information database.

If a first user writes and sends a question message (S30), the application server generates and stores a message ID, and makes an ID of the first user (i.e., the question writer) correspond to the message ID (S35). The application server sends the message ID to a second user selected from the acquaintances of the first user and makes the ID of the second user correspond to the message ID (S40).

If the second user, having received the message, has knowledge that can be used to answer the corresponding question (S50), the application server writes an answer (S70). If not, the application server forwards the message ID to a third user selected from among acquaintances of the second user (S55).

The forwarding process may be sequentially repeated on the on-line human network. If a $k^{th}$ user (where k is an integer greater than or equal to two) received the question message from $(k-1)^{th}$ user, the $k^{th}$ user can forward the message to a $(k+1)^{th}$ user among his or her acquaintances. The k h user himself can both give an answer and forward the message to his or her acquaintance, if appropriate. If there is no intention to give an answer or forward the message, the $k^{th}$ user can delete the message. The answer can be directly forwarded to the question writer with reference to the user ID on the question message forwarding path corresponding to the question ID.

Figure 13:
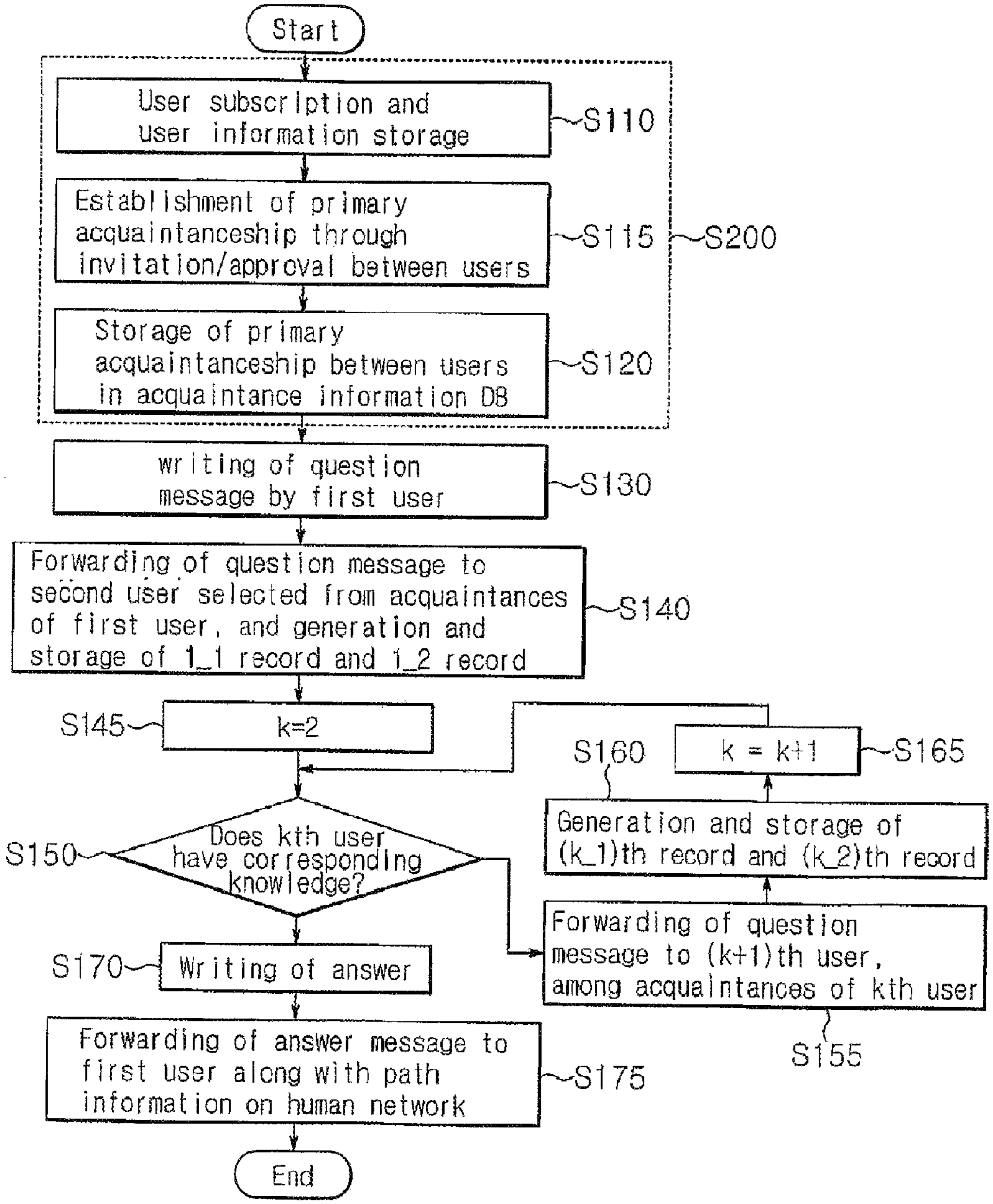
FIG. 13 is a flowchart illustrating the on-line human network-based knowledge sharing method according an embodiment of to the present invention.

FIG. 13 is a flowchart illustrating an on-line human network-based knowledge sharing method according to an embodiment of the present invention. A process of constructing the acquaintance information database 14 constituting the on-line human network is shown (S200). If a user subscribes to service, information about the user is stored (S110). The primary acquaintance is formed through the above-described invitation/approval process between users (S115). The server 20 recognizes the primary acquaintance and stores information about the primary acquaintance between the users in the acquaintance information database 14 as an adequate data structure (S120). Through the process, information about the on-line human network is constructed in the acquaintance information database 14.

If a first user writes and sends a question message in step S130, the application server 20 forwards the message to a second user selected from among the acquaintances of the first user, generates a $(1\_1)^{th}$ record and a $(1\_1)^{th}$ record and stores the generated $(1\_1)^{th}$ record and $(1\_2)^{th}$ record in the user database 12 (S140). If the second user, having received the message, has knowledge that can be used to answer the corresponding question (S150), the application server 20 writes an answer (S170). If not, the application server 20 forwards the message ID to a third user selected from among acquaintances of the second user in step S155.

The forwarding process may be sequentially repeated on the on-line human network. If a $k^{th}$ user (where k is an integer equal to or greater than two) has received the question message from $(k-1)^{th}$ user, the $k^{th}$ user can forward the message to a $(k+1)^{th}$ user from among his or her acquaintances (S155). At this time, as the question message is transmitted, a $(k\_1)^{th}$ message record and a $(k\_2)^{th}$ message record are generated and are stored in the user databases of the $k^{th}$ user and the $(k+1)^{th}$ user, respectively, (S160). The $k^{th}$ user himself can both give an answer and forward the message to his or her acquaintance, if appropriate. If having no intention to give an answer or forward the message, the $k^{th}$ user can delete the message.

The question management server 30 can determine the question message forwarding path on the on-line human network, either repeatedly or finally, by frequently searching the message records in the user database through the process shown in FIG. 10 and forwarding the message to one or more users including the question writer on the question forwarding path along with an answer to the question during the question forwarding process in step S175.

Figure 14:
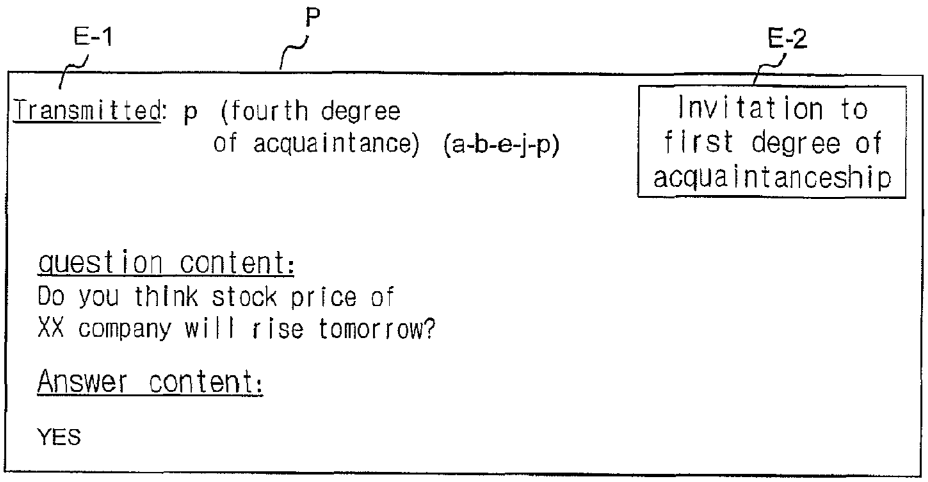
FIG. 14 illustrates the content of an answer message.

FIG. 14 illustrates the construction of an answer message. An answer message P shown in FIG. 14 includes question content and answer content, and indicates the relationship of an answer writer and a question writer (for example, a fourth degree of acquaintanceship) on the on-line human network and a forwarding path (for example, a-b-e-j-p) along with an answer writer (E-1) (for example, a user 'p') to the question writer. The answer message P allows the primary acquaintanceship with the answer writer to be formed, if appropriate, (E-2) so that an on-line human network with persons having sought information can be easily constructed. To share knowledge on the on-line human network, incentives such as cyber money and mileage can be provided to users on the path.

Furthermore, the application server can sense the forwarding of the question message whenever the message is forwarded so that how his or her question message is forwarded on the on-line human network can be known and can be displayed on the terminal of the question writer. To this end, it can be visualized using the diagram graph as shown in FIG. 4. Only the degree of acquaintanceship, etc. on the on-line human network, of a user who has received the message, can be displayed.

The application server 20 can analyze the forwarding and answer path of the question message on the on-line human network and extract a relay hub, a knowledge hub and so on. In the analysis process, for example, in the on-line human network-based knowledge sharing system according to an embodiment of the present invention, the server 20 can collect the reactions (answer or forwarding) of users, which are recognized in the server 20 from the terminals 310, 320, 330 and 340 of the users who have received the question, on a user basis. The server 20 can consider a user who has given lots of answers to be a knowledge hub and a user who has performed many forwarding operations as a relay hub based on the collected reactions.

Alternatively, a knowledge hub can be selected using a method of individually evaluating the degree of contribution of each answer writer based on the evaluation of the content of an answer by a question writer (for example, a grade, such as A, B and C, can be input according to the degree of satisfaction), and a predetermined incentive is given. Alternatively, a method of resetting the relationship with an answer writer (for example, the setting of a hoody relationship) can be used.

A part or all of the technical spirit of the present invention can be implemented in various non-transitory forms such as hardware, software and recording media in which software is recorded. Although embodiments of the present invention have been illustrated and described, the present invention is not limited to the above-described specific embodiments. Those skilled in the art can make various modifications without departing from the scope of the invention claimed in the accompanying claims, and the modifications fall within the scope of the accompanying claims. As described above, in accordance with an embodiment of the present invention, reliable information or knowledge of questions can be shared by utilizing message records and an on-line human network. Furthermore, in accordance with an embodiment of the present invention, a person who has received a question can forward the question to his or her acquaintances and an answer can be forwarded to a person who has first written the question, through the on-line human network. Therefore, a reliable answer can be obtained from a person who has expert knowledge in a corresponding field. In addition, in accordance with an embodiment of the present invention, new on-line acquaintanceships can be constructed through question forwarding and answering. Accordingly, the on-line human network can be activated. Furthermore, in accordance with an embodiment of the present invention, a forwarding path of a question can be monitored through the on-line human network. This can increase the dependability of answers. Incentives can be given to answer writers, if needed. It is thus possible to activate knowledge sharing.

What is claimed is:

1. A method for facilitating propagation of inquiries and answers thereto in connection with a website, which allows users registered with the website to network with each other, wherein each user is allowed to maintain a network list of other users to share information, the network list further including a number that the other users have answered questions or a number that the other users have forwarded questions, the method comprising:

receiving, by a server of the website, an inquiry from a first user with a first command to send the inquiry to at least one user from a first network list of the first user;

sending, by the server, the inquiry to the at least one user from the first network list, wherein the at least one user includes a second user;

receiving, by the server, a second command from the second user to send the inquiry to at least one user from a second network list of the second user;

sending, by the server, the inquiry to the at least one user from the second network list, wherein the at least one user from the second network list includes a third user, and the first user does not have an established acquaintanceship with the third user;

tracking, by the server, the propagation of the inquiry so as to generate tracking information indicating that the inquiry is propagated from the first user to the at least one user from the first network list, that the inquiry is further propagated from the second user to the at least one user from the second network list;

receiving, by a terminal associated with the first user, a first notification when the second user sends, by the server, the inquiry to the third user;

receiving, by the server, an answer to the inquiry from a user accessible to the inquiry;

determining, by the server, that the inquiry originated from the first user using the tracking information; and notifying the first user that the answer is available;

wherein acquaintanceship between users registered with the website comprises primary acquaintanceship and secondary acquaintanceship, and inquiries are sent only between users having the primary acquaintanceship.

2. The method of claim 1, wherein the server comprises a single computer or a plurality of interconnected computers whether clustered at a single geographical location or scattered at more than one geographical location.

3. The method of claim 1, wherein tracking comprises:

after receiving the first command, associating the inquiry with the first user and the at least one user from the first network list;

after receiving the second command, associating the inquiry with the second user and the at least one user from the second network list; and after receiving the third command, associating the inquiry with the third user and the at least one user from the third network list.

4. The method of claim 3, wherein tracking further comprises processing information relating to association of the inquiry with users so as to generate the tracking information.

5. The method of claim 1, wherein the sending the inquiry to the at least one user from the first network list comprises sending an email.

6. The method of claim 1, wherein the sending the inquiry to the at least one user from the first network list comprises transmitting data to display the inquiry to a terminal associated with the at least one user from the first network list when the at least one user from the first network list logs on the website.

7. A method to facilitate obtaining an answer to an inquiry in connection with a website, which allows users registered with the website to network with each other, wherein each user is allowed to maintain a network list of other users to share information, the network list further including a number that the other users have answered questions or a number that the other users have forwarded questions, the method comprising;

sending, from a terminal associated with a first user, a command to the website to send an inquiry to at least one user from a first network list of the first user;

receiving, by the terminal associated with the first user, a first notification when a second user from the at least one user from the first network list sends the inquiry to at least one user from a second network list of the second user, wherein the at least one user from the second network list comprises includes a third user, and the first user does not have an established acquaintanceship with the third user; and receiving, by the terminal, an answer to the inquiry from a user to whom the inquiry has been sent;

wherein acquaintanceship between the users registered with the website comprises primary acquaintanceship and secondary acquaintanceship, and inquiries are sent only between users having the primary acquaintanceship.

8. A method of facilitating propagation of a question message among registered users of a website, the method comprising:

providing an acquaintance information database storing identifications (IDs) of a plurality of users registered with the website, wherein each registered user is allowed to maintain an acquaintance list comprising other registered users in the acquaintance information database, the acquaintance list further including a number that the other registered users have answered questions or a number that the other registered users have forwarded questions;

receiving from a first registered user a question message;

assigning a question identification (ID) to the question message;

associating a first user ID of the first registered user with the question ID;

sending, by a request of the first user, the question message to a second registered user selected from the acquaintance list of the first registered user;

associating a second user ID of the second registered user with the question ID so as to generate tracking information indicating that the question message is propagated from the first registered user to the second registered user;

sending, by a request of the second registered user, the question message to a third registered user selected from the acquaintance list of the second registered user, wherein the first user does not have an established acquaintanceship with the third user; and receiving, by a terminal associated with the first user, a first notification when the question message is sent, by a request of the second registered user, to a third registered user;

wherein acquaintanceship between the users registered with the website comprises primary acquaintanceship and secondary acquaintanceship, and question messages are sent only between users having the primary acquaintanceship.

9. The method of claim 8, further comprising:

associating a third user ID of the third registered user with the question ID, wherein the tracking information further indicates that the question message is further propagated from the second registered user to the third registered user regardless of whether the third registered user answers the question.

10. The method claim 9, further comprising:

receiving, from the third registered user, an answer message in reply to the question message;

determining that the question message is originated from the first registered user using the tracking information; and allowing the first registered user to access the answer message.

11. The method of claim 10, further comprising allowing the first registered user to access the tracking information.

12. The method of claim 10, further comprising allowing the first registered user to provide a predetermined incentive to at least one of the registered users, who are on a path to the third registered user who has answered the question message.

13. The method of claim 10, further comprising updating the acquaintance list of the first registered user to include information of the third registered user, who has replied to the question message.

14. A non-transitory computer readable storage medium storing an executable program, which when executed by a computer performs the steps of:

providing an acquaintance information database storing identifications (IDs) of a plurality of users registered with the website, wherein each registered user is allowed to maintain an acquaintance list comprising other registered users in the acquaintance information database, the acquaintance list further including a number that the other registered users have answered questions or a number that the other registered users have forwarded questions;

receiving from a first registered user a question message;

assigning a question identification (ID) to the question message;

associating a first user ID of the first registered user with the question ID;

sending, by a request of the first user, the question message to a second registered user selected from the acquaintance list of the first registered user;

associating a second user ID of the second registered user with the question ID so as to generate tracking information indicating that the question message is propagated from the first registered user to the second registered user;

sending, by a request of the second registered user, the question message to a third registered user selected from an acquaintance list of the second registered user, wherein the first user does not have an established acquaintanceship with the third user;

associating a third user I D of the third registered user with the question ID, wherein the tracking information further indicates that the question message is further propagated from the second registered user to the third registered user; and receiving, by a terminal associated with the first registered user, a first notification when the question message is sent, by the request of the second registered user, to the third registered user;

wherein acquaintanceship between the users registered with the website comprises primary acquaintanceship and secondary acquaintanceship, and question messages are sent only between users having the primary acquaintanceship.

15. A method for facilitating propagation of a question message via a website, the method comprising:

providing an acquaintance information database, wherein the acquaintance information database includes IDs of a plurality of users registered with the website, wherein each registered user is allowed to maintain an acquaintance list comprising other registered users in the acquaintance information database, the acquaintance list further including a number that the other registered users have answered questions or a number that the other registered users have forwarded questions;

providing a tracking database for storing information on propagation of question messages;

receiving from a first registered user a question message;

recording, in the tracking database, a first record indicating that the question message is received from the first registered user;

sending, by a request of the first registered user, the question message to a second registered user selected from the acquaintance list of the first registered user to receive the question message;

recording, in the tracking database, a second record indicating that the question message from the first registered user is available to the second registered user;

sending, by a request of the second registered user, the question message to a third registered user selected from the acquaintance list of the second registered user, the first user does not have an established acquaintanceship with the third user;

recording, in the tracking database, a third record indicating that the question message is sent from the second registered user to the third registered user;

recording, in the tracking database, a fourth record indicating that the question message from the second registered user is available to the third registered user;

receiving, by the first registered user, a first notification when the question message is sent, by the request of the second registered user, to the third registered user;

wherein acquaintanceship between users registered with the website comprises primary acquaintanceship and secondary acquaintanceship, and question messages are sent only between users having the primary acquaintanceship.

16. The method of claim 15, wherein the first record comprises a question message ID and the first registered user ID.

17. The method of claim 15, wherein the second record comprises a question message ID and a second registered user ID.

18. The method of claim 15, further comprising:

receiving, from the third user, an answer message in reply to the question message;

determining that the question message is originated from the first user using tracking information recorded in the tracking database; and allowing the first user to access the answer message using the tracking information.

19. The method of claim 15, further comprising allowing the first registered user to access the tracking information.

* * * * *